(12) United States Patent
Lee

(10) Patent No.: US 11,493,681 B2
(45) Date of Patent: Nov. 8, 2022

(54) BACKLIGHT UNIT AND DISPLAY DEVICE COMPRISING THE SAME

(71) Applicant: LG Display Co., Ltd., Seoul (KR)

(72) Inventor: Suhun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/556,580

(22) Filed: Dec. 20, 2021

(65) Prior Publication Data

US 2022/0206209 A1 Jun. 30, 2022

(30) Foreign Application Priority Data

Dec. 30, 2020 (KR) .......................... 10-2020-0187697

(51) Int. Cl.
*F21V 8/00* (2006.01)
*G09G 3/34* (2006.01)

(52) U.S. Cl.
CPC ......... *G02B 6/0068* (2013.01); *G02B 6/0083* (2013.01); *G09G 3/3426* (2013.01)

(58) Field of Classification Search
CPC ... G02B 6/0068; G02B 6/0083; G09G 3/3426
See application file for complete search history.

(56) References Cited

U.S. PATENT DOCUMENTS

| | | | | |
|---|---|---|---|---|
| 8,393,775 B2* | 3/2013 | Kim | .................. | G02F 1/133603 362/613 |
| 8,403,511 B2* | 3/2013 | Bae | ...................... | G02B 6/0078 362/330 |
| 8,511,845 B2* | 8/2013 | Jeong | ................ | G02F 1/133611 362/97.3 |
| 2010/0244058 A1* | 9/2010 | Weng | ................ | G02F 1/133603 257/E33.001 |
| 2010/0321619 A1* | 12/2010 | Tsai | .................. | G02F 1/133526 349/114 |
| 2011/0051412 A1* | 3/2011 | Jeong | ................ | G02F 1/133611 362/235 |
| 2019/0265549 A1* | 8/2019 | Chen | ................. | G02F 1/133605 |

FOREIGN PATENT DOCUMENTS

| | | | | |
|---|---|---|---|---|
| DE | 102020115536 A1 | * | 12/2020 | ............ G02B 6/002 |
| GB | 2585398 A | | 1/2021 | |
| KR | 10-2012-0065753 A | | 6/2012 | |
| WO | WO 2020/222357 A1 | | 11/2020 | |

\* cited by examiner

*Primary Examiner* — Mary Ellen Bowman

(74) *Attorney, Agent, or Firm* — Birch, Stewart, Kolasch & Birch, LLP

(57) ABSTRACT

A backlight unit and a display device including the backlight unit are discussed. The backlight unit can include a printed circuit, a plurality of light sources disposed on the printed circuit, and a first base film disposed on the printed circuit and including a plurality of first holes provided in an area where the plurality of light sources are disposed and a plurality of second holes spaced apart from the plurality of first holes, wherein the plurality of second holes surround the plurality of first holes. The backlight unit can further include a plurality of light source protectors disposed on the printed circuit and disposed in the plurality of first holes, a plurality of light path converters disposed on the printed circuit and including a material different from the light source protectors, and a light control film disposed on the light source protectors and the light path converters.

20 Claims, 13 Drawing Sheets

FIG.13

| INFORMATION | COMPARATIVE EXAMPLE | EMBODIMENT |
|---|---|---|
| FWHM(nm) | 18.4 | 16.3 |
| FIRST DISTANCE(mm) | 81 | 70 |
| SECOND DISTANCE(mm) | 157 | 137 |

BACKLIGHT UNIT AND DISPLAY DEVICE COMPRISING THE SAME

CROSS REFERENCE TO RELATED APPLICATION

This application claims priority to Korean Patent Application No. 10-2020-0187697, filed on Dec. 30, 2020 in the Republic of Korea, the entire contents of which are hereby expressly incorporated by reference in its entirety into the present application.

BACKGROUND

Field of the Disclosure

The present disclosure relates to a backlight unit and a display device including the backlight unit.

Description of the Background Art

A display device can include a display panel in which a plurality of sub-pixels are disposed, and various driving circuits for driving elements disposed in the sub-pixels. Further, depending on the type of the display device, the display device can include a backlight unit for supplying light to the display panel.

The backlight unit can include a plurality of light sources and several optical members. In addition, the backlight unit can be disposed on the opposite side of the image display surface to supply light to the display panel.

Accordingly, the thickness of the display device can increase due to the backlight unit included in the display device. In addition, when the thickness of the backlight unit is reduced to reduce the thickness of the display device, an optical gap between the light source and the display panel may not be sufficiently secured, so that image quality can be deteriorated.

In addition, as the amount of light provided to the display panel increases, the luminance of the display panel can be improved. In order to increase the amount of light provided to the display panel, high power consumption can be needed.

In addition, when the backlight unit is driven by a local dimming method that is driven for each local area, a halo phenomenon can occur in which light emitted from one light emitting area spreads to other adjacent light emitting areas that are not driven. Therefore, the contrast ratio characteristic can be deteriorated.

Therefore, there is a need to provide a display device having a thin thickness and improved optical characteristics.

SUMMARY OF THE DISCLOSURE

Various aspects of the present disclosure relate to a backlight unit for improving image quality while reducing the thickness thereof, and a display device including the same.

Various aspects of the present disclosure relate to a backlight unit for increasing the amount of light emitted without increasing power consumption, and a display device including the same.

Various aspects of the present disclosure relate to a backlight unit in which light emitted from one light emitting area is not diffused to other adjacent light emitting area in a local dimming method, and a display device including the same According one aspect, a backlight unit includes a printed circuit, a plurality of light sources disposed on the printed circuit, a first base film disposed on the printed circuit and including a plurality of first holes provided in an area where the plurality of light sources are disposed and a plurality of second holes spaced apart from the plurality of first holes, wherein the plurality of second holes surround the plurality of first holes, a plurality of light source protectors disposed on the printed circuit and disposed in the plurality of first holes, a plurality of light path converters disposed on the printed circuit, disposed in the plurality of second holes and including a material different from that of the plurality of light source protectors, and a light control film disposed on the light source protectors and the light path converters.

According to another aspect, a display device includes a display panel and the above-mentioned backlight unit to supply light to the display panel.

According to exemplary aspects, a backlight unit and a display device including the backlight unit can improve the image quality while reducing the thickness thereof.

According to exemplary aspects, a backlight unit and a display device including the backlight unit can increase the amount of light emitted without increasing power consumption.

According to exemplary aspects, a backlight unit and a display device including the backlight unit can prevent or reduce the halo phenomenon in the local dimming method.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

FIG. 13 is a table comparing optical characteristics of the display device according to the embodiment and the display device according to the comparative example.

DETAILED DESCRIPTION OF THE EMBODIMENTS

Figure 1:
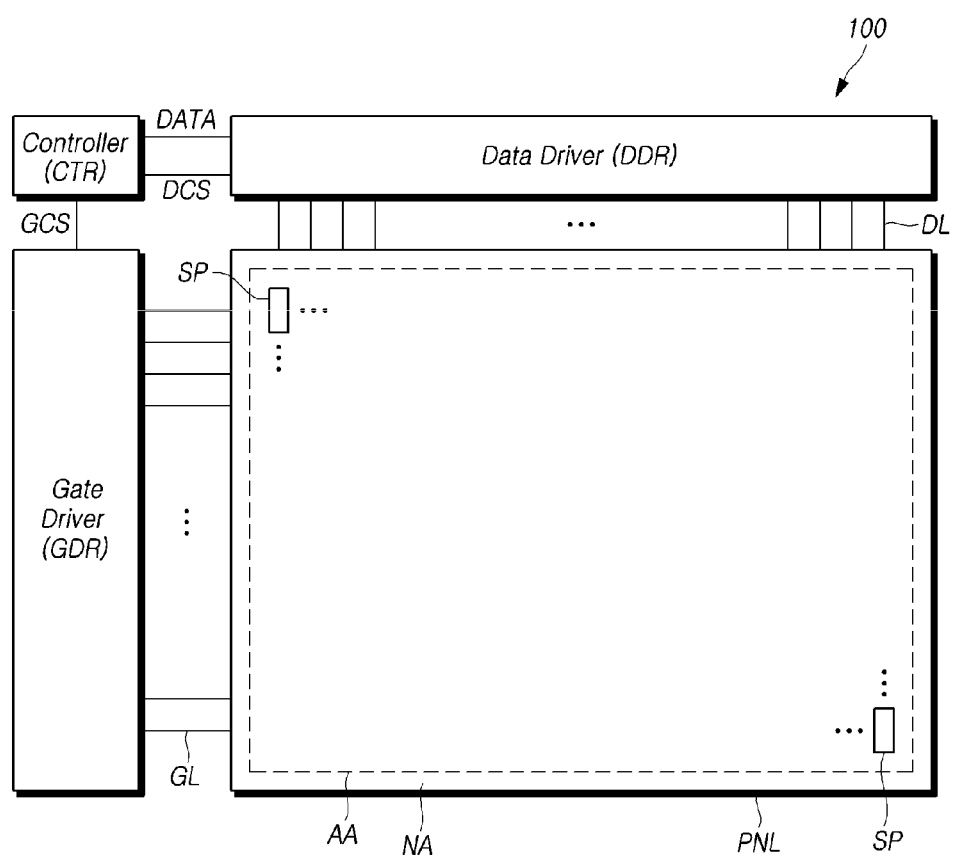
FIG. 1 illustrates a schematic configuration of a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "can".

Hereinafter, exemplary aspects will be described in detail with reference to the accompanying drawings.

FIG. 1 illustrates a schematic configuration of a display device according to embodiments of the present disclosure. All the components of a display device 100 according to all embodiments of the present disclosure are operatively coupled and configured.

Referring to FIG. 1, the display device 100 according to the embodiments of the present disclosure can comprise a display panel 110 including an active area AA and a non-active area NA. Furthermore, the display device 100 can comprise a gate driving circuit 120, a data driving circuit 130, and a controller 140 for driving the display panel 110.

A plurality of gate lines GL and a plurality of data lines DL can be arranged on the display panel 110, and the plurality of subpixels SP can be disposed in the areas where the gate lines GL and the data lines DL intersect each other.

The gate driving circuit 120 is controlled by the controller 140, and sequentially outputs scan signals to a plurality of gate lines GL arranged on the display panel 110, thereby controlling the driving timing of a plurality of subpixels SP.

The gate driving circuit 120 can comprise one or more gate driver integrated circuits GDIC, and can be disposed only at one side of the display panel 110, or can be disposed at both sides thereof according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, the gate driver integrated circuit GDIC can be integrated and arranged on the display panel 110. In addition, each gate driver integrated circuit GDIC can be implemented by a chip-on-film COF method in which an element is mounted on a film connected to the display panel 110.

The data driving circuit 130 receives image data from the controller 140 and converts the image data into an analog data voltage. Then, the data driving circuit 130 outputs the data voltage to each data line DL according to the timing at which the scan signal is applied through the gate line GL so that each of the plurality of subpixels SP emits light having brightness according to the image data.

The data driving circuit 130 can comprise one or more source driver integrated circuits SDIC. Each source driver integrated circuit SDIC can comprise a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, the source driver integrated circuit SDIC can be integrated and arranged on the display panel 110. In addition, each source driver integrated circuit SDIC can be implemented by a chip-on-film COF method in which each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 allows the gate driving circuit 120 to output a scan signal according to the timing implemented in each frame, and converts a data signal received from the outside to conform to the data signal format used in the data driving circuit 130 and then outputs the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 outputs various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 outputs various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

In addition, the controller 140 can control the luminance of each area of the display panel 110 by controlling the light emitting operation of the backlight unit of the display device 100 through the local dimming technology.

The display device 100 can further comprise a power management integrated circuit for supplying various voltages or currents to the display panel 110, the gate driving circuit 120, the data driving circuit 130, and the like or controlling various voltages or currents to be supplied thereto.

Each of the plurality of subpixels SP can be an area defined by the intersection of the gate line GL and the data line DL, and a liquid crystal or a light-emitting element can be disposed therein depending on the type of the display device 100.

For example, in the case that the display device 100 is a liquid crystal display device, the display device 100 can comprise a light source device such as a backlight unit for emitting light to the display panel 110, and a liquid crystal can be disposed in the subpixel SP of the display panel 110. In addition, since the arrangement of the liquid crystal is adjusted by the electric field produced due to the data voltage applied to each subpixel SP, the brightness according to image data can be realized, thereby displaying images.

Figure 2:
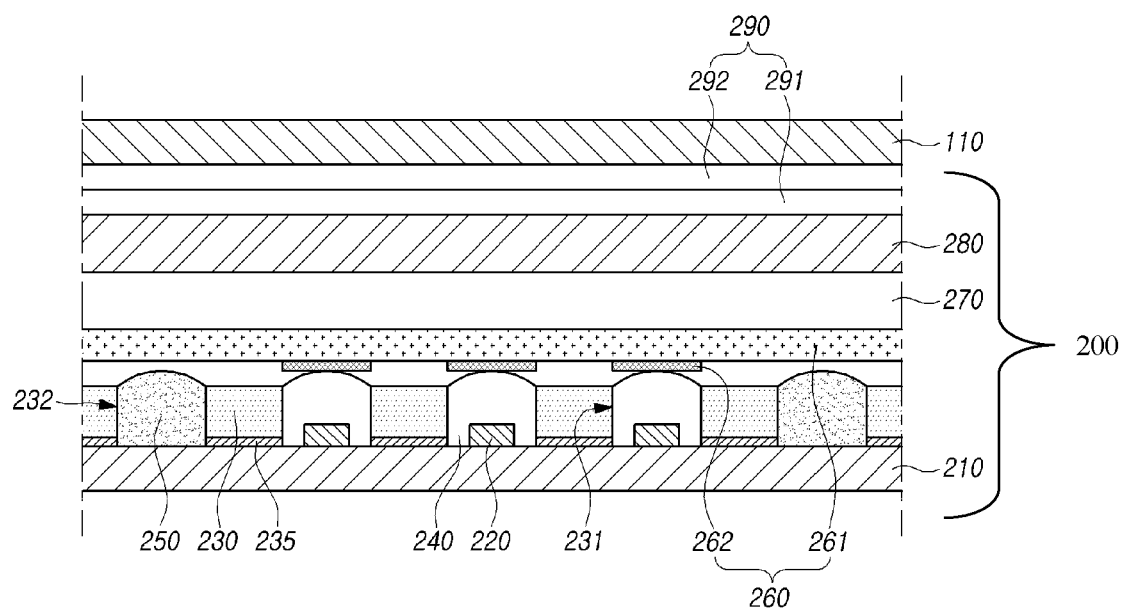
FIG. 2 is a cross-sectional view of a portion of a display device according to an embodiment of the present disclosure.

FIG. 2 is a cross-sectional view of a portion of a display device according to an embodiment of the present disclosure.

Referring to FIG. 2, the display device 100 includes a display panel 110 and a backlight unit 200 disposed under the display panel 110 to supply a light to the display panel 110.

The backlight unit 200 can include a printed circuit 210, a light source 220, a first base film 20, a light source protector 240, a light path converter 250, and a light control film 260. The backlight unit 200 can further include a diffusion plate 270, a color conversion sheet 280, and an optical sheet 290.

The light source 220 can be plural. The plurality of light sources 220 can be disposed on one surface of the printed circuit 210 to be spaced apart from each other.

The light source 220 can be, for example, a light emitting diode (LED), and can be an organic light emitting diode (OLED), a small mini light emitting diode (Mini LED) or a micro light emitting diode (µLED). Accordingly, the light source 220 in the form of a chip can be disposed to be mounted on the printed circuit 210, thereby reducing the thickness of the backlight unit 200.

The light source 220 can emit white light or, in some cases, can emit light of a specific wavelength band. For example, the light source 220 can emit blue light. The blue light can be excited through an optical member disposed on the light source 220 so that the white light can be supplied to the display panel 110.

The first base film 230 can be disposed on the printed circuit 210. For example, the first base film 230 can be disposed in an adhesive state through the adhesive layer 235 disposed on the printed circuit 210. The adhesive layer 235 can be a transparent adhesive tape or a layer in which a transparent adhesive material is cured, but it is not limited thereto.

The first base film 230 can be a transparent film. For example, the first base film 230 can include polyethylene terephthalate (PET), polycarbonate (PC), or polyolefin, but it is not limited thereto.

The first base film 230 can include a plurality of holes. Specifically, the first base film 230 can include a plurality of first holes 231 and a plurality of second holes 232.

The least one first hole 231 can be surrounded by the plurality of second holes 232.

The light source 220 can be disposed in the plurality of first holes 231. For example, one light source 220 can be disposed in one first hole 231. For example, on the printed circuit 210, the first base film 230 can be disposed in at least some of the areas where the light source 220 is not disposed.

When the light source 220 is disposed in the form of a chip, since the size of the light source 220 is small, the height of the first base film 230 can be higher than the height of the light source 220. For example, the position of the top surface of the first base film 230 can be higher than the position of the top surface of the light source 220 disposed in the first hole 231.

In addition, the light source protector 240 can be disposed in the first hole 231 of the first base film 230. The light source protector 240 can cover the light source 220 in the first hole 231 of the first base film 230, and through this, the light source protector 240 can protect the light source 220.

The light source protector 240 can include a transparent material so that the efficiency of the light emitted from the light source 220 is not reduced. For example, the light source protector 240 can include a transparent silicone resin, but it is not limited thereto.

When the light source protector 240 includes the silicone resin, the surface of the light source protector 240 can have a convex shape, but it is not limited thereto. In addition, the position of at least a portion of the top surface of the light source protector 240 can be higher than the position of the top surface of the first base film 230.

In addition, since the light source protector 240 is disposed in the first hole 231 of the first base film 230, the plurality of light source protectors 240 on the printed circuit 210 are spaced apart from each other.

The light path converter 250 can be disposed in the plurality of second holes 232 of the first base film 230.

The light path converter 250 can include a material different from that of the light source protector 240. The light path converter 250 can include a non-transparent resin. For example, the light path converter 250 can include a white silicon resin. In addition, the light path converter 250 can include a plurality of particles. The plurality of particles can be titanium oxide (TiOx) particles.

The light incident on the light path converter 250 can be reflected, refracted, scattered, or diffracted. In particular, when the light path converter 250 includes the white silicon resin and the plurality of particles, the light path converter 250 can have a substantially constant reflectance.

Accordingly, the light path converter 250 can reflect, refract, scatter, or diffract at least a portion of the light emitted from the light source 220, and again reflect, refract, scatter, or diffract a portion of the light scattered, reflected or diffracted light from the light control film 260, so that the path of the light emitted from the light source 220 can be finally converted in the direction of the display panel 110.

Accordingly, among the light emitted from the light source 220, the light that is not directed toward the display panel 110 and is trapped in the backlight unit 200 is emitted in the direction of the display panel 110 by the light path converter 250, there is an effect that the luminance of the display apparatus 100 can be improved.

As shown in FIG. 2, a light control film 260 can be disposed on a plurality of light sources 220, a first base film 230, a plurality of light source protector 240, and the plurality of light path converter 250.

The light control film 260 can include a second base film 261 and a plurality of first light path control patterns 262.

The second base film 261 can be a transparent film. For example, the second base film 261 can include polyethylene terephthalate (PET) or polycarbonate (PC), but the present invention is not limited thereto.

A plurality of first light path control patterns 262 can be disposed on at least one of a top surface or a bottom surface of the second base film 261.

The plurality of first light path control patterns 262 can be disposed at positions corresponding to each of the plurality of light sources 220 on the bottom surface of the second base film 261. Also, the plurality of first light path control patterns 262 can be disposed at positions corresponding to each of the plurality of light source protectors 240.

At least a portion of the first light path control pattern 262 can be disposed to overlap with the light source 220, and in consideration of the light diffusion characteristics, the first light path control pattern 262 can be disposed to overlap with an area including the area where the light source 220 is disposed.

In addition, each of the plurality of first light path control patterns 262 can be disposed to correspond to the first hole 231 provided in the first base film 230.

In addition, in some cases, the area of the first light path control pattern 262 can be the same as that of the first hole 231 of the first base film 230. Alternatively, the area of the first light path control pattern 262 can be smaller or larger than the first hole 231 of the first base film 230 depending to the intensity of the light emitted from the light source 220 or the distance between the light source 220 and the first light path control pattern 252. The area of the first light path control pattern 262 and the area of the first hole 231 of the first base film 230 can be a planar area.

At least a portion of the first light path control pattern 262 can be in contact with at least a portion of the surface of the light source protector 240.

Through this structure, the gap between the light control film 260 including the first light path control pattern 262 and the printed circuit 210 on which the light source protector 240 is disposed can be minimized, thereby reducing the thickness of the backlight unit 200.

The first light path control pattern 262 can have a constant reflectance, and can scatter, reflect, diffract, or transmit a portion of the light emitted from the light source 220. Specifically, the first light path control pattern 262 can scatter, reflect, or diffract the portion of light emitted from the light source 220 in a vertical or oblique direction. Also, the first light path control pattern 262 can be a light control pattern capable of transmitting a portion of the light irradiated from the light source 220.

For example, the first light path control pattern 262 scatters the light emitted from the light source 220 so that the light can be emitted in a vertical direction and an oblique direction. Alternatively, the first light path control pattern 262 reflects the light emitted from the light source 220 and the light path converter 250 re-reflects the light, so that the light can be emitted to the area between the light sources 220.

For example, a luminance deviation between the area where the light source 220 is disposed and the area between the light sources 220 can be reduced by disposing the first light path control pattern 262 in the area where the intensity of the light emitted from the light source 220 is strongest. The area where the light source 220 is disposed can correspond to the area with a large amount of light. The area between the light sources 220 can correspond to the area with a small amount of light.

As described above, the image quality of the backlight unit 200 can be improved by adjusting the emission direction of the light emitted from the light source 220 through the first light path control pattern 262. For example, the light emitted from the light source 220 is scattered, reflected, diffracted, or transmitted by the first light path control pattern 262, so that the luminance uniformity of the backlight unit 200 can be improved.

In addition, as shown in FIG. 2, the diffusion plate 270 for diffusing light incident from the bottom can be disposed on the second base film 261 of the light control film 260.

The light control film 260 can further include an adhesive layer, and the light control film 260 can be attached to one surface of the diffusion plate 270 through the adhesive layer of the light control film 260.

A color conversion sheet 280 for changing a wavelength band of light emitted from the light source 220 can be disposed on the diffusion plate 270. In addition, one or more optical sheets 290 can be disposed on the color conversion sheet 280. For example, the optical sheet 290 can include a prism sheet 291 and a diffusion sheet 720.

Although FIG. 2 shows a structure in which the color conversion sheet 280 is disposed on the diffusion plate 270, the present invention is not limited thereto. For example, the diffusion plate 270 is disposed on the color conversion sheet 280.

The diffusion plate 270 can serve to diffuse the light transmitted through the second base film 261.

The color conversion sheet 280 can emit light of a specific wavelength band in response to light incident on the color conversion sheet 280. For example, when the light source 220 is the light source 220 that emits light of the specific wavelength band such as blue light, the color conversion sheet 280 responds to the a portion of incident light to emit the light of the second wavelength band such as green light and the light of a third wavelength band such as red light. Accordingly, light of a white wavelength band can be supplied to the display panel 110 through the color conversion sheet 280.

The color conversion sheet 280 can be disposed only on a partial area on the diffusion plate 270 in some cases. For example, when the light source 220 is a light source emitting blue light, the color conversion sheet 280 is only used in an area of the display panel 110 except for an area corresponding to the area where the blue sub-pixel SP is disposed. For example, light that does not pass through the color conversion sheet 280 can reach the blue sub-pixel SP of the display panel 110.

The color conversion sheet 280 may not be arranged according to the light source 220. For example, when the light source 220 emits white light or a color conversion film emitting green light and red light is coated on the emitting surface of the light source 220 that emits blue light, the color conversion sheet 280 may not be arranged.

As such, the backlight according to the embodiment includes the second base film 261 on which the first light path control pattern 262 positioned to correspond to the light source 220 is disposed, and optical elements, so that it can satisfy image quality while reducing the thickness thereof.

In addition, the light source protector 240 is disposed in the first hole 231 of the first base film 230 in which the plurality of light sources 220 are disposed and the light path converter 250 is disposed in the second hole 232 of the base film 230 in which the light source 220 is not disposed, so that optical efficiency can be improved.

Also, the backlight unit 200 having the above-described structure can be divided into a plurality of areas, and the backlight unit 200 can be driven in a local dimming method driven for each area.

Figure 3:
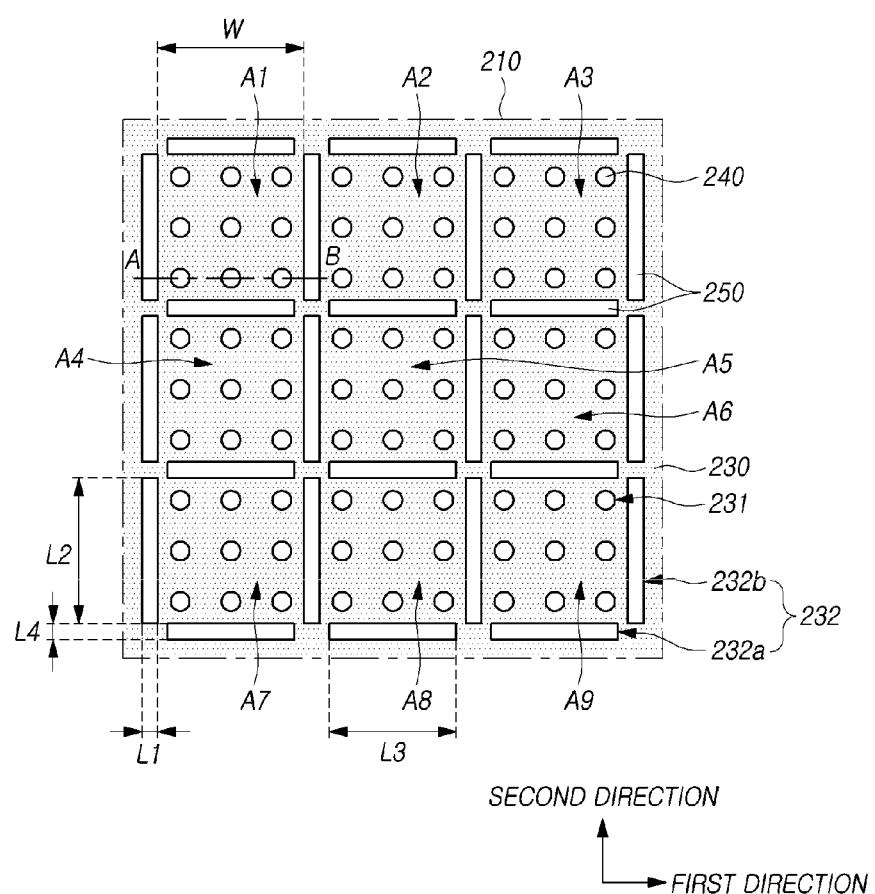
FIG. 3 schematically showing the structure of the printed circuit and the first base film according to an embodiment of the present disclosure.

FIG. 3 schematically showing the structure of the printed circuit and the first base film according to an embodiment of the present disclosure.

Referring to FIG. 3, the first base film 230 can be disposed on the printed circuit 210. The first base film 230 can include a plurality of first holes 231 and a plurality of second holes 232 spaced apart from the plurality of first holes 231.

The plurality of first holes 231 can be disposed to be spaced apart from each other, and the plurality of second holes 232 can also be disposed to be spaced apart from each other.

The plurality of second holes 232 include a plurality of first patterns 232a arranged in a first direction and a plurality of second patterns 232b arranged in a second direction intersecting the first direction.

As shown in FIG. 3, the first pattern 232a and the second pattern 232b can be formed in a bar shape on a plane, but it is not limited thereto. For example, the first pattern 232a and the second pattern 232b can have various shapes such as an ellipse or a polygon. However, in the following description, for convenience of explanation, each of the first pattern 232a and the second pattern 232b will be mainly described in terms of a bar-shaped planar structure.

In the plurality of first patterns 232a, a width L1 in the first direction can be shorter than a length L2 in the second direction on a plane. In addition, in the plurality of second patterns 232b, a length L3 in the first direction can be longer than a width L4 in the second direction on a plane. For example, the plurality of first patterns 232a can have long sides extending in the second direction, and the plurality of second patterns 232b can have long sides extending in the first direction.

Each of the plurality of first patterns 232a can be disposed to be spaced apart from each other, and each of the plurality of second patterns 232b can be disposed to be spaced apart from each other. The first pattern 232a and the second pattern 232b can be disposed to be spaced apart from each other. For example, each of the plurality of patterns included in the second hole 232 can be disposed to be spaced apart from each other.

Since the two first patterns 232a adjacent to each other are disposed to be spaced apart from each other, a separation distance W between the two first patterns 232a can exist. In addition, the length L3 of the long side of the two second patterns 232b defining one light emitting area of the printed circuit 210 can be shorter than the separation distance W between the two first patterns 232a, but it is not limited thereto.

For example, when the size of the printed circuit 210 increases, the length L3 of the long side of the two second patterns 232b can be equal to or greater than the separation distance W between the two first patterns 232a.

The printed circuit 210 can be divided into a plurality of light emitting areas, and the plurality of light sources disposed on the printed circuit 210 can be driven by a local dimming method driven for each light emitting area.

In the local dimming method, by linking the luminance with the image signal, the area corresponding to the dark part of the image is in a state in which the light source 220 is turn-off or a state in which the amount of light emitted from the light source 220 is small, and the area corresponding to the bright part thereof is in a state in which the light source 220 is turn-on or a state having high luminance characteristics, thereby lowering the contrast ratio and power consumption.

As described above, the printed circuit 210 can include the plurality of light emitting areas. Each light emitting area can be defined by the first pattern 232a and the second pattern 232b of the second hole 232 of the first base film 230 disposed on the printed circuit 210.

Each light emitting area of the printed circuit 210 can be defined by two first patterns 232a adjacent to each other and two second patterns 232b adjacent to two first patterns 232a and disposed to overlap with the area between two first patterns 232a.

Specifically, a rectangular area defined by extending the two first patterns 232a in the second direction and extending the second patterns 232b in the first direction can be the light emitting areas A1 to A9 of the printed circuit 210.

As described above, each of the two first patterns 232a and the two second patterns 232b defining one light emitting area of the printed circuit 210 can be disposed to be spaced apart from each other.

Since each pattern included in the second hole 232 is spaced apart from each other, the light emitting area of the first base film 230 corresponding to each light emitting area of the printed circuit 210 may not be separated from each other by the second hole 232. However, when both of the two first patterns 232a and the two second patterns 232b defining one light emitting area are connected to each other, the light emitting area defined by the two first patterns 232a and the two second patterns 232b can be separated from the first base film 230.

The plurality of light emitting areas A1 to A9 of the printed circuit 210 can be arranged in a matrix form.

Specifically, the number of light emitting areas of the printed circuit 210 can be plural in each of the first direction and the second direction.

In addition, at least one first pattern 232a or at least one second pattern 232b can be used to define two light emitting areas adjacent to each other.

For example, the first light emitting area A1 and the second light emitting area A2 can be disposed adjacent to each other in the first direction. In this case, one second pattern 232b disposed between the first light emitting area A1 and the second light emitting area A2 can be used to define the first light emitting area A1 and the second light emitting area A2.

Also, the first light emitting area A1 and the fourth light emitting area A4 can be disposed adjacent to each other in the second direction. In this case, one first pattern 232a disposed between the first light emitting area A1 and the fourth light emitting area A4 can be used to define the first light emitting area A1 and the fourth light emitting area A4.

Due to this structure, at least a portion of each of the plurality of light emitting areas A1 to A9 can be surrounded by two first patterns 232a and two second pattern 232b. On the other hand, when the length L3 of the long side of the two second patterns 232b in the first direction is shorter than the separation distance W between the two first patterns 232a, a portion of the edge of the light emitting area may not be surrounded by the first pattern 232a and the second pattern 232b.

Each of the plurality of light emitting areas A1 to A9 defined on the printed circuit 210 can include the first base film 230 and the plurality of first holes 231 provided in the base film 230. Specifically, the plurality of first holes 231 of the first base film 210 can disposed in each of the plurality of light emitting areas A1 to A9.

The plurality of first holes 231 disposed in one light emitting area can be disposed to be spaced apart from each other. A light source can be disposed in each of the plurality of first holes 231.

For example, the plurality of light sources can be disposed in one light emitting area. For example, one light emitting area can include a number of light sources corresponding to the number of first holes 231 included in the light emitting area.

In addition, each light emitting area including a plurality of light sources can be individually driven by the local dimming method.

For example, a signal can be applied to the first light emitting area A1 to emit light from a plurality of light sources disposed in the first light emitting area A1, but no signal is applied to the second light emitting area A2 not to be emitted from the plurality of light sources disposed in the second light emitting area A2.

In this way, the contrast ratio characteristics can be improved by adjusting the brightness of each light emitting area of the printed circuit 210. In addition, since a signal may not be applied to some of the light emitting areas A1 to A9 of the printed circuit 210, the effect of reducing power consumption can be obtained A light source protector 240 disposed to surround the light source can be disposed in the plurality of first holes 231.

In addition, a light path converter 250 including a material different from that of the light source protector 240 can be disposed in each of the plurality of first patterns 232a and the plurality of second patterns 232b of the second hole 232.

The display device 100 can improve the brightness thereof and at the same time prevent the halo phenomenon by the light source protector 240 disposed in the first hole 231 and the light path converter 250 disposed in the second hole 232.

The halo phenomenon is a phenomenon in which light emitted from one light emitting area is emitted over other adjacent light emitting area. When the light emitted from one light emitting area passes over other adjacent light emitting area where light should not be emitted or a small amount of light should be emitted, the contrast ratio of the display device 100 can be lowered.

However, in the backlight unit 200 according to embodiments, the light path converter 250 is disposed in the second hole 232 of the first base film 230, thereby preventing halo phenomenon. A detailed review of these effects with reference to FIG. 4 is as follows.

Figure 4:
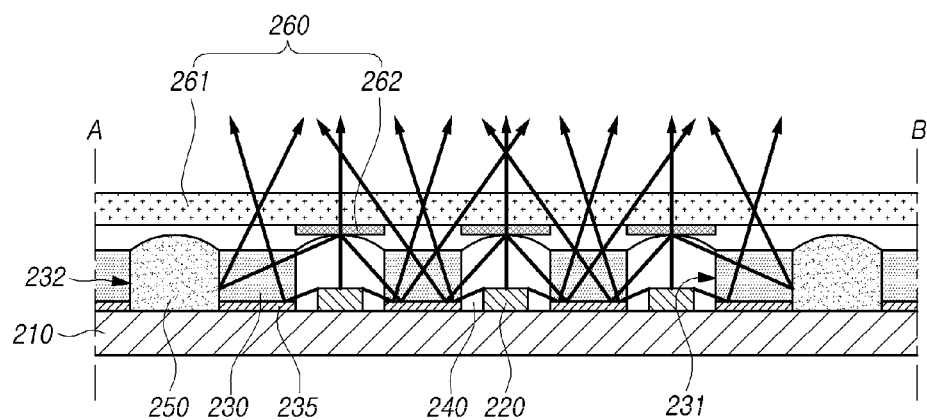
FIG. 4 is a cross-sectional view along line A-B of FIG. 3.

FIG. 4 is a cross-sectional view along line A-B of FIG. 3.

Referring to FIG. 4, the second hole 232 of the first base film 230 surrounds one light emitting area of the printed circuit 210.

A portion of the light emitted from the light sources 220 disposed in the first hole 231 of the first base film 230 can be incident on the first light path control pattern 262. Specifically, the light emitted from the light sources 220 is incident on the light source protector 240 through the first light path control pattern 262.

In order to prevent loss of light emitted from the light sources 220, the light source protector 240 can include a transparent material.

A portion of the light incident on the first light path control pattern 262 passes through the first light path control pattern 262 or is reflected, refracted, scattered or diffracted to emit outside the light control film 260.

The light incident on the first light path control pattern 262 is not only the light incident in a direction perpendicular to the surface of the first light path control pattern 262, but also can be light incident in a direction not perpendicular to the surface of the first light path control pattern 262, and the light is reflected, refracted, scattered, or diffracted by the first light path control pattern 262 and emitted to the outside of the light control film 260, so that the luminance of backlight the unit 200 can be improved.

Another portion of the light incident on the first light path control pattern 262 is reflected, refracted, scattered or diffracted by the first light path control pattern 262 to be incident on the light path converter 250 disposed in the second hole 232 of t the first base film 230.

In addition, a portion of the light incident from the plurality of light sources 220 such as the light emitted from the light sources in an oblique direction can also be incident on the light path converter 250. The light emitted in the oblique direction from the light source 220 means light emitted in a direction other than a direction perpendicular to the surface of the first light path control pattern 262.

The light incident on the light path converter 250 can be reflected, refracted, scattered, or diffracted by the light path converter 250 to be output to the outside of the light control film 260.

In order to reflect, refract, scatter or diffract light, the light path converter 250 can include a non-transparent resin, and can include a plurality of particles in the resin. For example, the light path converter 250 can include a white silicon resin and a titanium oxide (TiOx) dispersed in the white silicon resin.

On the other hand, a portion of the light emitted in the oblique direction from the plurality of light sources 220 (e.g., the light that does not reach the first light path control pattern) can be not output to the outside of the light control film 260, and be trapped within the backlight unit 200.

On the other hand, the backlight unit 200 according to the embodiment output a portion of the light emitted in the oblique direction from the plurality of light sources 220 to the outside of the light control film 260 by the light path converter 250, thereby improving its luminance.

As described with reference to FIG. 3, the light path converter 250 disposed in the second hole 232 of the first base film 230 can be disposed to surround at least a portion of one light emitting area.

When the light emitted from the plurality of light sources 220 disposed in one light emitting area is incident on the light control film 260, it can be reflected, refracted, scattered or diffracted by the light path converter 250 to change the path of the light so that it can be emitted to the outside of the light control film 260, and may not pass through other adjacent light emitting areas.

For example, when the backlight unit 200 is driven in the local dimming method, it can prevent the halo phenomenon by the light path converter 250 disposed to surround at least a portion of one light emitting area.

As described above, the light source protector 240 having high light transmittance is disposed in the plurality of first holes 231 of the first base film 230 and the light path converter 250 including a material capable of reflecting, refracting, scattering, or diffracting light can be disposed in the plurality of second holes 232 of the first base film 230.

For example, different materials can be filled in the first hole 231 and the second hole 232 of the first base film 230, and thus, the light source protector 240 and a light path converter 250 can be formed through different processes as described below.

Figure 5:
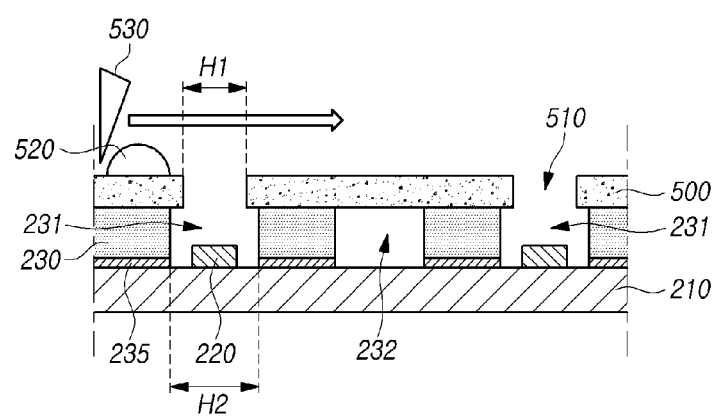
FIG. 5 illustrates a process of forming a light source protection part in a first hole of a first base film.
Figure 6:
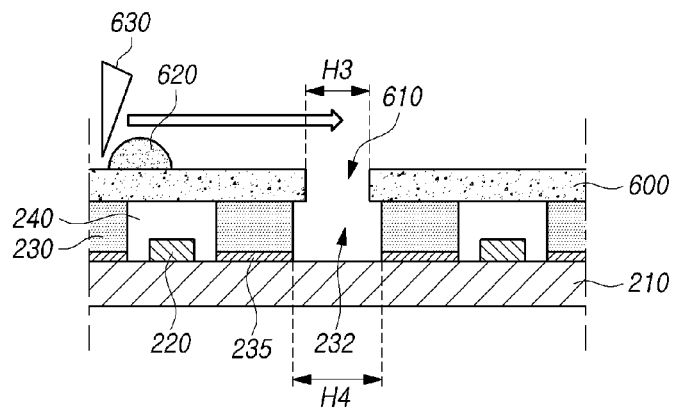
FIG. 6 illustrates a process of forming a light path converter in a second hole of a first base film.

FIG. 5 illustrates a process of forming a light source protection part in a first hole of a first base film. FIG. 6 illustrates a process of forming a light path converter in a second hole of a first base film.

Referring to FIG. 5, the first base film 230 including the plurality of first holes 231 and the plurality of second holes 232 can be attached on the printed circuit 210 in which the plurality of light sources 220 is mounted, through the adhesive layer 235.

On the first base film 230, the first mask 500 or the first screen pattern can be arranged for forming the light source protector 240 in the first hole 231 of the first base film 230. The first mask 500 can include a plurality of first mask holes 510. Each of the plurality of first mask holes 510 can be disposed at a position corresponding to the first hole 231 of the first base film 230.

After disposing the first mask 500 on the first base film 230, a light source protection material 520 can be filled in the first hole 231 of the first base film 230 through a screen printing process.

Specifically, the light source protection material 520 can be prepared on the first mask 500, and the squeeze 530 can move in various directions to spread the light source protection material 520. Accordingly, a portion of the light source protection material 520 is coated on the top surface of the first mask 500, and the remaining portion thereof passes through the first mask hole 510 and is filled into the first hole 231 of the first base film 230.

After a process of filling the light source protection material 520 in the first hole 231 of the first base film 230 through this process, the light source protector 240 can be formed through a process of curing the light source protecting material 520 in the first hole 231.

The width H1 of the first mask hole 510 of the first mask 500 can be smaller than the width H2 of the first hole 231 of the first base film 230. Each of the width H1 of the first mask hole 510 and the width H2 of the first hole 231 of the first base film 230 can mean the maximum length in the same direction as the direction in which the surface of the printed circuit 210 extends As described above, the width H1 of the plurality of first mask holes 510 is smaller than the width H2 of the first hole 231 of the first base film 230 so as to prevent the light source protection material 520 from overflowing from the first hole 231 of the first base film 230.

In some cases, the width H1 of the first mask hole 510 and the width H2 of the first hole 231 of the first base film 230 can be the same as each other.

As shown in FIG. 6, the first base film 230 is formed. a second mask 600 or a second screen pattern) can be disposed on the first base film 230 in which the light source protector 240 is disposed in the first hole 231 for forming the light path convertor 250 in the second hole 231.

The second mask 500 can include a plurality of second mask holes 610. Each of the plurality of second mask holes 610 can be disposed at a position corresponding to the second hole 232 of the first base film 230.

After disposing the second mask 600 on the first base film 230, the light path conversion material 620 can be filled in the second hole 232 of the first base film 230, through a screen printing process.

Specifically, the light path conversion material 620 is prepared on the second mask 600, and the squeeze 630 is moved in various directions to spread the light path conversion material 620. Accordingly, a portion of the light path converter material 620 is coated on the top surface of the second mask 600, and the remaining portion passes through the second mask hole 610 and is filled in the second hole 232 of the first base film 230.

Through this process, after the light path converting part material 620 is filled in the second hole 232 of the first base film 230, the light path converter 250 can be formed through a process of the curing light path converter material 620 in the second hole 232.

The width H3 of the second mask hole 610 of the second mask 600 is smaller than the width H4 of the second hole 232 of the first base film 230. Each of the width H3 of the second mask hole 610 and the width H4 of the second hole 232 of the first base film 230 can mean the maximum length in the same direction as the direction in which the surface of the printed circuit 210 extends.

As described above, the width H3 of the plurality of second mask holes 610 is smaller than the width H4 of the second hole 232 of the first base film 230, so as to prevent the light path conversion material 620 from overflowing from the second hole 232 of the first base film 230. In some cases, each of the width H3 of the second mask hole 610 and the width H4 of the second hole 232 of the first base film 230 can be the same as each other.

Each of the surfaces of the light source protector 240 and the light path converter 250 formed through such a process can have a convex shape. For example, as shown in FIGS. 2 and 4, with respect to the surface of the first base film 230, the surface of each of the light source protector 240 and the light path converter 250 can have a shape protruding in the direction of the light control film 260 disposed on the first base film 230.

The surface of each of the finally formed light source protector 240 and light path converter 250 can have the convex shape due to the surface tension of each of the light source protection material 520 and the light path converter material 620, but it is not limited thereto. For example, the surface of at least one of the light source protector 240 and the light path converter 250 can be flat or concave.

Figure 7:
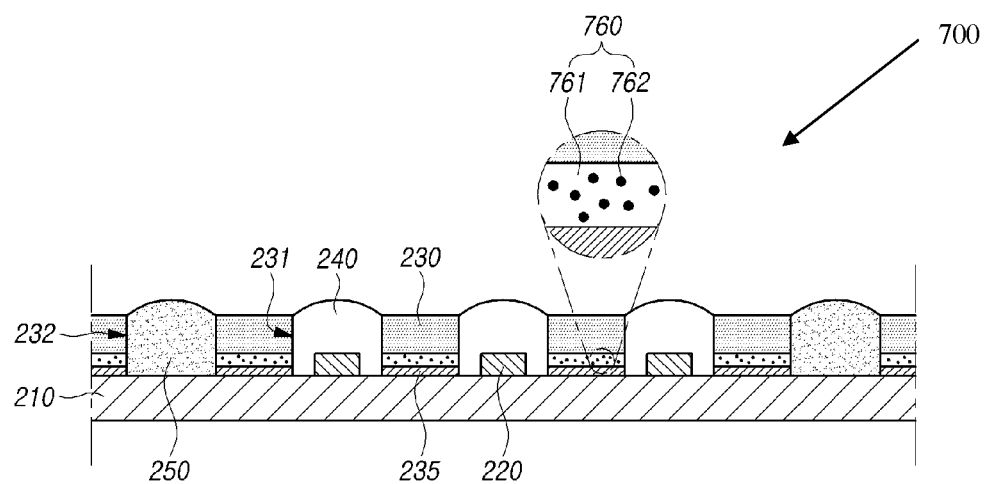
FIG. 7 is a cross-sectional view of a backlight unit according to another embodiment of the present disclosure.
Figure 8:
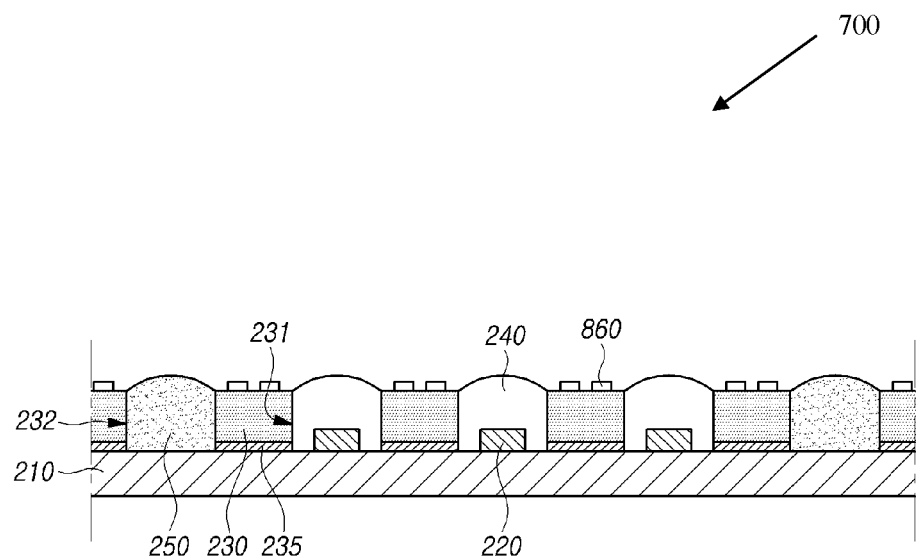
FIG. 8 is a cross-sectional view of the display device including the backlight unit of FIG. 7.

FIG. 7 is a cross-sectional view of a backlight unit according to another embodiment of the present disclosure. FIG. 8 is a cross-sectional view of the display device including the backlight unit of FIG. 7.

Referring to FIGS. 7 and 8, a backlight unit 700 according to this embodiment includes a printed circuit 210, a light source 220, a first base film 230, a light source protector 240, and a light path converter 250. The backlight unit 700 can further include a light control film 260, a diffusion plate 270, a color conversion sheet 280, and an optical sheet 290 disposed on the first base film 230. The light control film 260, the diffusion plate 270, the color conversion sheet 280, and the optical sheet 290 can be the same as them of the backlight unit 200, but it is not limited thereto.

The base film 230 can be disposed on the printed circuit 210 in which the plurality of light sources 220 are mounted, and includes a plurality of first holes 231 and a plurality of second holes 232.

The first base film 230 can be attached to the printed circuit 210 through the adhesive layer 235.

At least one layer of the second light path control pattern 760 can be disposed between the first base film 230 and the adhesive layer 235. The matrix 761 of the second light path control pattern 760 can include a plurality of particles 762 dispersed therein.

The matrix 761 of the second light path control pattern 760 can include a white silicon resin. The plurality of particles 762 of the second light path control pattern 760 can be titanium oxide (TiOx) particles.

The second light path control pattern 760 can include a material corresponding to the light path converter 250 disposed in the second hole 232 of the first base film 230. Accordingly, the light incident on the second light path control pattern 760 can be reflected, refracted, scattered, or diffracted.

When the first base film 230 includes polyethylene terephthalate (PET) or polycarbonate (PC), a portion of the light incident on the base film 230 among the light emitted from the plurality of light sources 220 can be absorbed or trapped in the first base film 230 not to be emitted to the outside due to a difference in refractive index between the adhesive layer 235 and the first base film 230.

In an embodiment, the second light path control pattern 760 is disposed between the first base film 230 and the adhesive layer 235 and, thus, light reaching the second light path control pattern 760 through the first base film 230 among the light incident on the first base film 230 can be reflected, refracted, scattered, or diffracted to be emitted to the outside of the light control film 260.

The brightness of the backlight unit 700 can be improved by allowing the light that will be absorbed by the first base film 230 or trapped in the first base film 230 to be emitted to the outside.

The matrix 761 of the second light path control pattern 760 can be colored (e.g., white) ink, and the plurality of particles 762 can be titanium oxide (TiOx) or a particle including a metal or a metal alloy.

Referring back to FIG. 8, the first base film 230 is disposed on the printed circuit 210 on which a plurality of light sources 220 are mounted, and including a plurality of first holes 231 and a plurality of second holes 232. The first base film 230 can be attached to the printed circuit 210 through the adhesive layer 235.

At least one light exit pattern 860 can be disposed on the first base film 230. The light exit pattern 860 can include a material having a refractive index greater than the refractive index of air. For example, the light exit pattern 860 can include a material corresponding to the diffusion plate 270 illustrated in FIG. 2.

As another example, the light exit pattern 860 can include at least one of poly methyl meta acryl (PMMA), polycarbonate, and polystyrene (PS).

The light incident on the light exit pattern 860 can be totally reflected on the surface of the light exit pattern 860 (e.g., the interface between the light exit pattern 860 and air) to exit in the direction of the light control film 260. This is because the light incident on the light exit pattern 860, which is a high refractive material, and the air, which is a low refractive material, is not refracted into air according to Snell's law but is reflected from the surface of the light exit pattern 860.

The amount of light transmitted through the light control film 260 due to the light exit pattern 860 can increase, so that the backlight unit 200 can improve the luminance characteristic.

When the plurality of light exit patterns 860 are disposed on the first base film 230, each of the plurality of light exit patterns 860 can be disposed to be spaced apart from each other. Since the plurality of light exit pattern s 860 are disposed to be spaced apart from each other, the entire surface area of the light exit pattern 860 can be increased, and thus, the amount of light totally reflected from the surface of the light exit pattern 860 is increased, and thus the backlight unit 700 can further improve the luminance characteristics.

Although the light exit pattern 860 is disposed on the first base film 230 as shown in FIG. 8 it is not limited thereto. For example, the light exit pattern 860 can be disposed between the first base film 230 and the adhesive layer 235 or between the first base film 230 and the printed circuit 210.

For example, the light exit pattern 860 can be disposed at a position corresponding to the position of the second light path control pattern 760 illustrated in FIG. 7.

Although at least a portion of the surface of the light source protector 240 disposed in the first hole 231 of the first base film 230 is in contact with at least a portion of the first light path control pattern 262, it is not limited thereto.

Figure 9:
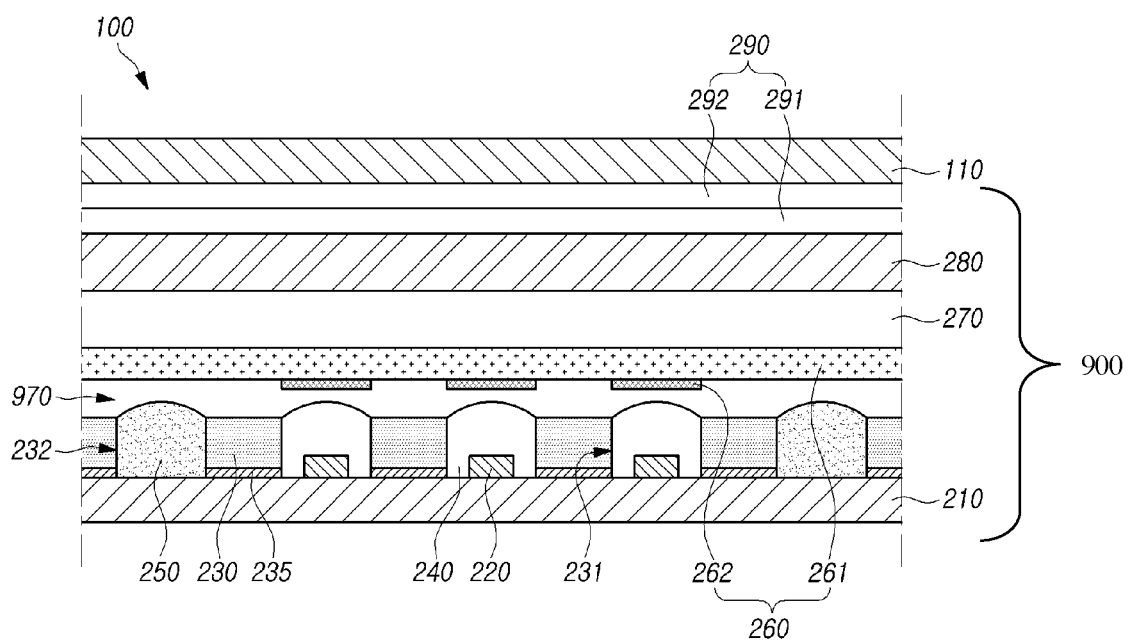
FIG. 9 is a cross-sectional view showing a part of a display device according to another embodiment of the present disclosure.

FIG. 9 is a cross-sectional view showing a part of a display device according to another embodiment of the present disclosure.

Referring to FIG. 9, the display device 100 can include a display panel 110 and a backlight unit 900.

The backlight unit 900 includes a printed circuit 210, a light source 220, a first base film 20, a light source protector 240, a light path converter 250, and a light control film 260. The backlight unit 900 can further include a diffusion plate 270, a color conversion sheet 280, and an optical sheet 290.

The first base film 230 is disposed on the printed circuit 210 on which the plurality of light sources 220 are mounted, and includes a plurality of first holes 231 and a plurality of second holes 232.

The light source 220 and the light source protector 240 are disposed in the first hole 231 of the first base film 230, and the light path converter 250 can be disposed in the second hole 232 of the first base film 230.

The light control film 260 can be disposed on the first base film 230, the light source protecting unit 240, and the light path converter 150.

A plurality of first light path control patterns 262 can be disposed on at least one of a top surface or a bottom surface of the second base film 261 of the light control film 260.

The plurality of first light path control patterns 262 can be disposed on the bottom surface of the second base film 261 at positions corresponding to each of the plurality of light sources 220. Also, the plurality of first light path control patterns 262 can be disposed at positions corresponding to each of the plurality of light source protectors 240.

Such a light control film 260 can be disposed to be spaced apart from each of the first base film 230, the light source protector 240, and the light path converter 250.

An air gap 970 exists between the first base film 230, the light source protector 240, and the light path converter 250, and the light control film 260. The air gap 970 can serve to diffuse the light passing through the first base film 230, the light source protector 240, and the light path converter 250.

For example, the air gap 970 diffuses the light transmitted through the first base film 230, the light source protector 240, and the light path converter 250, thereby allowing a uniform amount of light to be incident on the light control film 260 and the diffusion plate 270. Accordingly, there can prevent the occurrence of mura due to the difference in luminance even in one light emitting area of the printed circuit 210.

Figure 10:
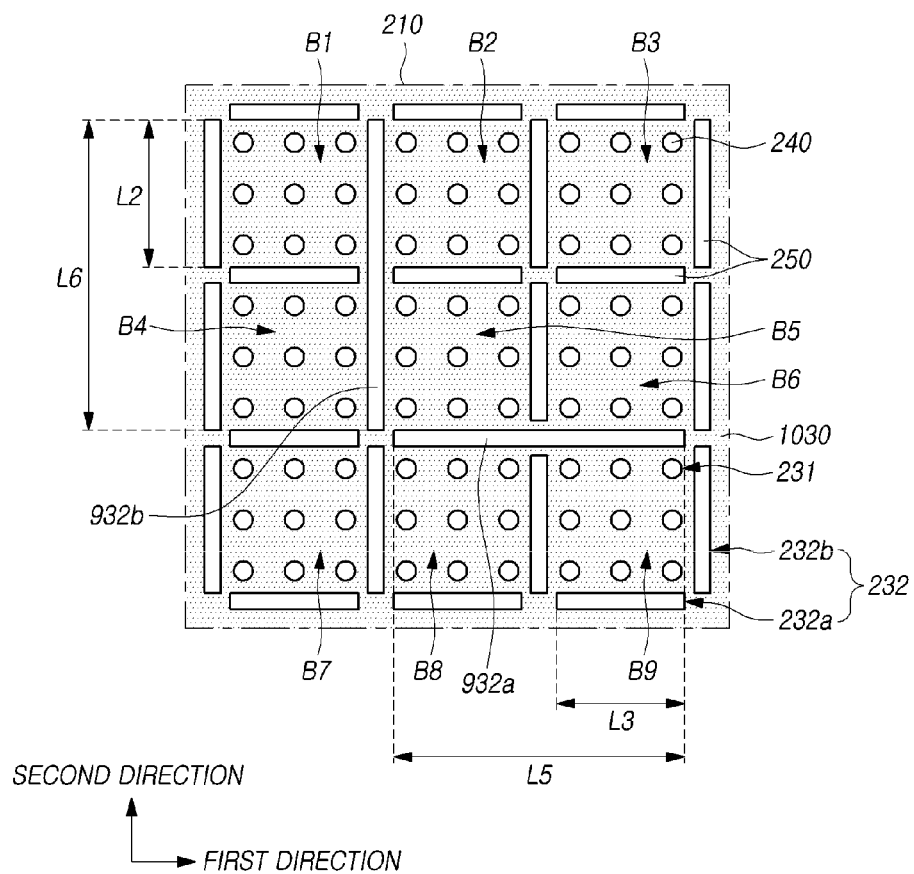
FIG. 10 illustrates the structure of the printed circuit and the first base film according to another embodiment of the present disclosure.

FIG. 10 illustrates the structure of the printed circuit and the first base film according to another embodiment of the present disclosure.

Referring to FIG. 10, a first base film 1030 can be disposed on the printed circuit 210, and includes a plurality of first holes 231 and a plurality of second holes 232.

The first base film 1030 can include a plurality of first holes 231 and a plurality of second holes 232 spaced apart from the plurality of first holes 231.

The plurality of first holes 231 can be disposed spaced apart from each other, and the plurality of second holes 232 can also be disposed spaced apart from each other.

The plurality of second holes 232 include a plurality of first patterns 232a arranged in a first direction and a second direction that intersects the first direction, and a plurality of second patterns 232b arranged in the first direction and the second direction.

Some portions of the plurality of first patterns 232a can be spaced apart from each other and other portions can be integrally formed.

Specifically, the first base film 1030 can include at least one third pattern 932a in which two adjacent first patterns 232a are integrally formed. Alternatively, the first base film 1030 can include at least one fourth pattern 932b in which two adjacent second patterns 232b are integrally formed.

In this case, the length L5 of the third pattern 932a in the first direction can be longer than the length L3 of the one first pattern 232a in the first direction. Also, the length L6 of the fourth pattern 932b in the second direction can be longer than the length L2 of the one second pattern 232b in the second direction.

The printed circuit 210 can include a plurality of light emitting areas B1 to B9. The portions B3 and B6 among the light emitting areas B1 to B9 of the printed circuit 210 are adjacent to two first patterns 232a and two first patterns 232a adjacent to each other, and can be defined by two second patterns 232b disposed to overlap the area between the two first patterns 232a.

In addition, other portions B5, B6, B8, and B9 of the light emitting areas B1 to B9 of the printed circuit 210 can be defined by one third pattern 932a, one first pattern 232a adjacent to one third pattern 932a and two second patterns 232b.

Other portions B1, B2, B4 and B5 of the light emitting area s B1 to B9 of the printed circuit 210 can be defined by two first patterns 232a, one second pattern 232b and one fourth pattern 932b adjacent to the second pattern 232b.

Each of the plurality of light emitting areas B1 to B9 can include the first base film 1030 and a first hole 231 provided in the first base film 1030. A light source and a light source protector 240 can be disposed in each of the first holes 231.

In addition, the light path converter 250 can be disposed inside each of the first pattern 232a, the second pattern 232b, the third pattern 932a, and the fourth pattern 932b of the first base film 1030 defining each light emitting area. The light path converter 250 can prevent light emitted from one light emitting area from passing to other adjacent light emitting area.

As an example, the first base film 1030 includes at least one third pattern 932a and at least one fourth pattern 932b, so that the light path converter 250 can be disposed also in the corner portion of at least one light emitting area.

Specifically, in each of the third pattern 932a and the fourth pattern 932b, even in the area corresponding to the corner of the light emitting area on a plane, the light emitted from the light emitting area does not pass over to the other light emitting area. By doing so, it is possible to prevent the halo phenomenon from appearing.

Due to the light path converter 250 disposed in the third pattern 932a and the fourth pattern 932b in the area corresponding to the corner of the light emitting area, light is reflected, refraction, scattered, diffracted to direct toward the display panel 110, thereby increasing the luminance of the display device 100.

The second patterns 232b adjacent to the third pattern 932a and positioned on the side surface of the third pattern 932a can be spaced apart from each other. Also, these second patterns 232b can be spaced apart from the third pattern 932a.

In this case, the third pattern 932a and the plurality of second patterns 232b are connected with each other so that it can be prevented the first base film 1030 included in at least one light emitting area being separated from the first base film 1030 included in other adjacent light emitting areas to be removed.

Therefore, the backlight units 200, 700 and 900 and the display device 100 including the same according to the above-described embodiments can improve luminance characteristics and can prevent the halo phenomenon from occurring during local dimming driving.

Figure 11:
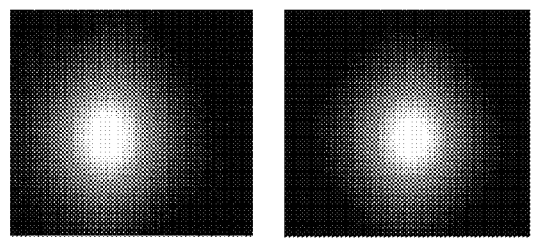
FIG. 11 is an image of light emitted from one light emitting area of each of the display device according to the embodiment and the display device according to the comparative example.
Figure 12:
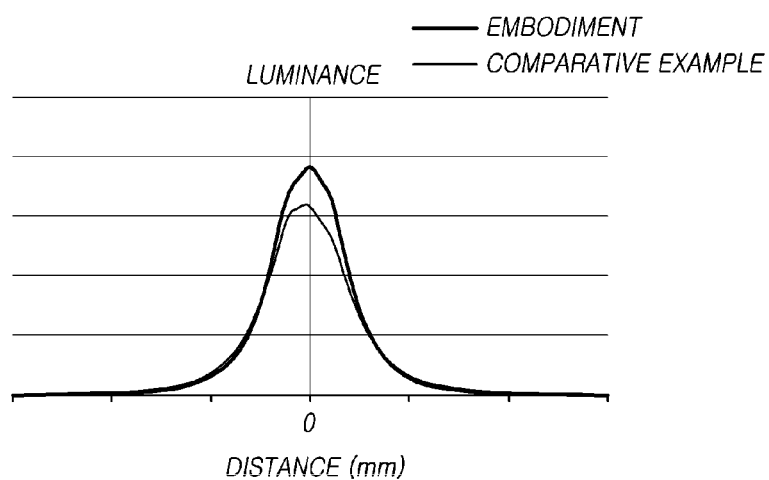
FIG. 12 is a graph comparing the intensity of the light shown in FIG. 11.

FIG. 11 is an image of light emitted from one light emitting area of each of the display device according to the embodiment and the display device according to the comparative example. FIG. 12 is a graph comparing the intensity of the light shown in FIG. 11. FIG. 13 is a table comparing optical characteristics of the display device according to the embodiment and the display device according to the comparative example.

The display device 100 according to the embodiment shown in FIGS. 11 to 13 corresponds to the structure of the display device shown in FIG. 2. In addition, the display device according to the comparative example of FIGS. 11 to 13 has a structure in which a plurality of light sources are mounted on a printed circuit substrate, a plurality of light sources are disposed in a plurality of holes provided in the reflector of the printed circuit substrate, and a diffusion plate, an optical sheet, and a display panel are disposed on such a printed circuit substrate.

Referring to FIG. 11, it can be seen that light emitted from one light emitting area of the display device according to the embodiment spreads over a narrower area than light emitted from one light emitting area of the display device according to the comparative example.

This is because the light incident on the light path converter 250 of the display device 100 according to the embodiment is reflected, refracted, scattered or diffracted by the light path converter 250 not to pass through other light emitting area, the light emitted from one light emitting area of the display device according to the embodiment can spread over a narrower area than the light emitted from one light emitting area of the display device according to the comparative example.

As shown in FIG. 11, it can be seen that the center of the light emitted from one light emitting area of the display device 100 according to the embodiment is brighter than the center of the light emitted from one light emitting area of the display device according to the comparative example.

Referring to FIG. 12, the difference in luminance at the center of one light emitting area of the display device according to the comparative example and the embodiment can be compared.

In FIG. 12, the x-axis can preferably mean distance, and when the center of each light emitting area is 0, the magnitude of the absolute value x can increase as the distance from the center increases. In addition, the y-axis can preferably mean a luminance value.

The luminance of the center of one light emitting area of the display device 100 according to the embodiment can be higher than the luminance of the center of one light emitting area of the display device according to the comparative example.

As described above, in the display device 100 according to an embodiment, the light path converter 250 can be disposed in the second hole 232 of the first base film 230 surrounding at least a portion of one light emitting area and the light incident on the light path converter 250 is reflected, refracted, scattered, or diffracted by the light path converter 250 to emit the outside of the light control film 260, so that the luminance of the central portion of the light emitting area can be improved.

In FIG. 13, the full width at half maximum (FWHM) of the graph for one light emitting area of each of the display devices according to the comparative example and the embodiment shown in FIG. 12, the first distance from the position where the light intensity of 1% of the light intensity of the center of the light emitting area appears, and the second distance from the position where the light intensity of 0.05% of the light intensity of the center of the light emitting area appears is shown.

Referring to FIG. 13, the full width at half maximum of light emitted from one light emitting area of the display device 100 according to the embodiment is narrower than the full width at half maximum of light emitted from one light emitting area of the display device according to the comparative example.

Specifically, the full width at half maximum of light emitted from one light emitting area of the display device 100 according to the embodiment is 16.3 nm. The full width at half maximum of light emitted from one light emitting area of the display device according to the comparative example is 18.4 nm.

In addition, it can be seen that the first distance from the center of the light emitting area of the display device 100 according to the embodiment is closer than the first distance from the center of the light emitting area of the display device according to the comparative example.

Specifically, the first distance from the center of the light emitting area of the display device 100 according to the embodiment is 70 mm. The first distance from the center of the light emitting area of the display device according to the comparative example appears is 81 mm.

The second distance from the center of one light emitting area of the display device according to the embodiment can be shorter than the second distance from the center of the light emitting area of the display device according to the comparative example.

Specifically, the second distance from the center of the light emitting area of the display device 100 according to the embodiment is 137 mm. The second distance from the center of the light emitting area of the display device according to the comparative example is 157 mm.

It can be seen that the light emitted from one light emitting area of the display device according to the comparative example spreads farther than the light emitted from one light emitting area of the display device 100 according to the embodiment due to the halo phenomenon. Accordingly, when driven by the local dimming method, the display device 100 according to the embodiment can have a higher contrast ratio than that of the display device according to the comparative example.

As shown in FIGS. 11 to 13, the luminance of the central portion of the light emitting area of the display device 100 according to the embodiment can be higher than the luminance of the central portion of the light emitting area of the display device according to the comparative example.

In particular, the light source protector 240 is disposed in the first hole 231 of the first base film 230 so that the efficiency of the light emitted from the light source 220 can be not lowered, the light path converter 250 is disposed in the second hole 232 of the first base film 230 surrounding at least a portion of the light emitting area, thereby allowing most of the light emitted from the light source 220 to be incident on the light control film 260 disposed on the first base film 230 and improving the luminance of the light emitting area.

In addition, the full width at half maximum of the light emitted from the light emitting area of the display device 100 according to the embodiment is narrower than the full width at half maximum of the light emitted from the light emitting area of the display device according to the comparative example, and the first distance and the second distance of the display device 100 according to the embodiment are shorter than those of the display device according to the comparative example, so that the display device 100 according to the embodiment can deviate or improve the halo phenomenon compared to the display device according to the comparative example.

In particular, due to the light path converter 250 surrounding at least a portion of the light emitting area of the display device 100 according to the embodiment, the light emitted from the light emitting area is prevented from passing over other light emitting area. By doing so, it is possible to suppress the occurrence of the halo phenomenon.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure.

Thus, the scope of the present disclosure is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A backlight unit comprising:
    a printed circuit;
    a plurality of light sources disposed on the printed circuit;
    a first base film disposed on the printed circuit, and including a plurality of first holes provided in an area where the plurality of light sources are disposed and a plurality of second holes spaced apart from the plurality of first holes, wherein the plurality of second holes surround the plurality of first holes;
    a plurality of light source protectors disposed on the printed circuit and disposed in the plurality of first holes;
    a plurality of light path converters disposed on the printed circuit, disposed in the plurality of second holes, and including a material different from a material of the plurality of light source protectors; and
    a light control film disposed on the plurality of light source protectors and the plurality of light path converters.

2. The backlight unit of claim 1, wherein the light source protector covers the light source in one of the plurality of first holes.

3. The backlight unit of claim 1, wherein the plurality of light source protectors are spaced apart from each other.

4. The backlight unit of claim 1, wherein the plurality of second holes comprise:
    a plurality of first patterns having long sides arranged in a first direction, and
    a plurality of second patterns having long sides arranged in a second direction intersecting the first direction.

5. The backlight unit of claim 4, wherein the plurality of first patterns are spaced apart from each other, and the plurality of second patterns are spaced apart from each other, and
    one of the plurality of first patterns and one of the plurality of second patterns are spaced apart from each other.

6. The backlight unit of claim 4, wherein the printed circuit comprises a plurality of light emitting areas wherein one light emitting area is an area surrounded by two adjacent first patterns and two adjacent second patterns.

7. The backlight unit of claim 6, wherein each of the plurality of light emitting areas is individually driven.

8. The backlight unit of claim 6, wherein, in the one light emitting area, some of the first holes among the plurality of first holes are surrounded by the two first patterns adjacent to each other and the two second patterns adjacent to each other.

9. The backlight unit of claim 4, wherein two adjacent first patterns among the plurality of first patterns are connected to each other.

10. The backlight unit of claim 4, wherein two adjacent second patterns among the plurality of second patterns are connected to each other.

11. The backlight unit of claim 1, wherein the first base film and at least one of the plurality of light source protectors comprise a transparent material.

12. The backlight unit of claim 1, wherein at least one of the plurality of light path converters comprises a white material and a plurality of particles.

13. The backlight unit of claim 1, wherein a surface of one of the plurality of light source protectors and a surface of one of the plurality of light path converters have a convex shape.

14. The backlight unit of claim 1, wherein the light control film comprises a second base film and a plurality of first light path control patterns disposed on one surface of the second base film,
    wherein each of the plurality of first light path control patterns is disposed at a position corresponding to each of the plurality of light sources.

15. The backlight unit of claim 1, further comprising a second light path control pattern disposed between the first base film and the printed circuit.

16. The backlight unit of claim 15, wherein the second light path control pattern comprises a white material and a plurality of particles.

17. The backlight unit of claim 1, further comprising at least one light emit pattern disposed between the first base film and the light control film or between the first base film and the printed circuit.

18. The backlight unit of claim 17, further comprising a diffuser plate disposed on the light control film,
    wherein the light emit pattern comprises a material corresponding to a material of the diffusion plate.

19. The backlight unit of claim 1, wherein a shape of the plurality of first holes and a shape of the plurality of second holes are different from each other.

20. A display device comprising:
    a display panel; and
    the backlight unit of claim 1 to supply light to the display panel.

* * * * *